(12) United States Patent
Kobayashi et al.

(10) Patent No.: US 6,775,445 B2
(45) Date of Patent: Aug. 10, 2004

(54) OPTICAL FIBER DROP CABLE

(75) Inventors: Kazunaga Kobayashi, Chiba (JP); Masahiro Kusakari, Chiba (JP); Shimei Tanaka, Chiba (JP); Matsuhiro Miyamoto, Chiba (JP); Keiji Ohashi, Chiba (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 10/295,865

(22) Filed: Nov. 18, 2002

(65) Prior Publication Data

US 2003/0133676 A1 Jul. 17, 2003

(30) Foreign Application Priority Data

Jan. 11, 2002 (JP) ........................................ 2002-004573
Feb. 5, 2002 (JP) ........................................ 2002-028492

(51) Int. Cl.[7] .............................................. G02B 6/44
(52) U.S. Cl. ...................................................... 385/113
(58) Field of Search ................................. 385/113, 100, 385/106, 114

(56) References Cited

U.S. PATENT DOCUMENTS 3,935,369 A * 1/1976 George et al. .............. 428/379
4,220,812 A * 9/1980 Ney et al. .................. 174/117 F
4,761,053 A * 8/1988 Cogelia et al. .............. 385/113
4,763,983 A * 8/1988 Keith .......................... 385/102
5,155,304 A * 10/1992 Gossett et al. ........... 174/117 R
5,448,670 A * 9/1995 Blew et al. .................. 385/112

FOREIGN PATENT DOCUMENTS

JP 2000-171673 6/2000
JP 2001-083385 3/2001

\* cited by examiner

*Primary Examiner*—Tulsidas C. Patel
(74) *Attorney, Agent, or Firm*—Oblon, Spivak, McClelland, Maier & Neustadt, P.C.

(57) ABSTRACT

An optical fiber drop cable is disclosed including an elongated optical element section composed of an optical fiber core wire and at least one pair of adjacent first tensile strength members, disposed on both sides of the optical fiber core wire in parallel thereto, which are covered with a cable sheath, and an elongated cable support wire section having a second tensile strength member covered with a sheath and adhered to the optical element section in parallel thereto. Since an outer periphery of the first tensile strength member is formed in a rugged configuration, an increased adhesive force is provided between the first tensile strength member and the cable sheath due to an anchoring effect of the rugged configuration.

7 Claims, 7 Drawing Sheets

FIG.3A  FIG.3B  FIG.3C
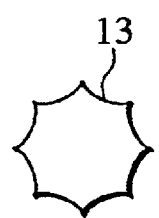
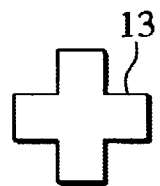
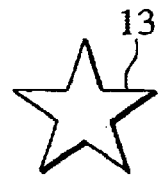
FIG.4
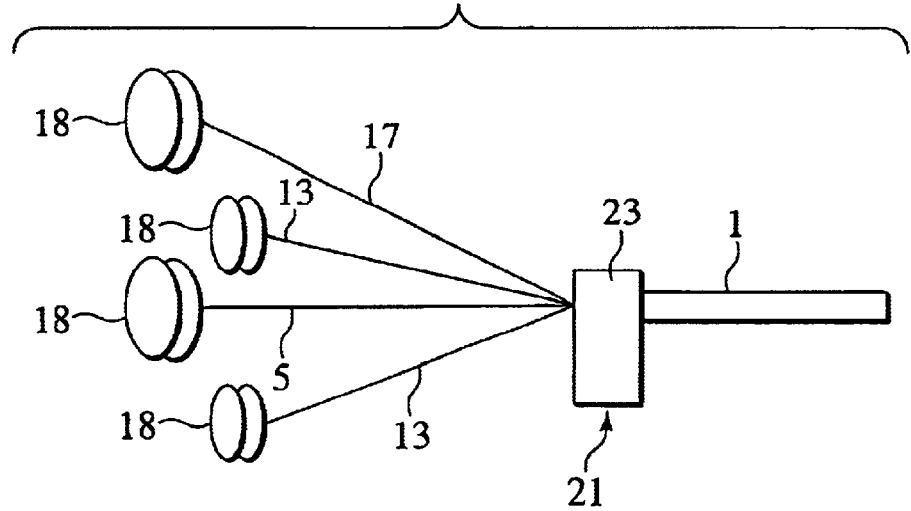

FIG.5

| | CROSS SECTIONAL SHAPE | SIZE OF CROSS SECTION OF TENSILE STRENGTH MEMBER | EXTRACTING FORCE (N/cm) |
|---|---|---|---|
| SAMPLE 1 | CIRCULAR SHAPE | 0.6mm φ | APPROXIMATELY 1~5 |
| SAMPLE 2 | CONFETTI TYPE (EIGHT LOBES) | CIRCUMSCRIBED CIRCLE DIAMETER: APPROXIMATELY 0.6mm φ  INSCRIBED CIRCLE: APPROXIMATELY 0.4mm φ | 10 |

FIG.6

| ITEM | CHARACTERISTIC | NOTES |
|---|---|---|
| OPTICAL TRANSMISSION LOSS | 0.25dB/km BELOW | (@1.55 μm) |
| TEMPERATURE CHARACTERISTIC (@1.55 μm) | 0.30dB/km BELOW | TEMPERATURE RANGE : −30∼+70℃ (@1.55 μm) |
| MECHANICAL CHARACTERISTICS (SIDE PRESSURE) | 0.1dB/km BELOW | 1200N/25mm (@1.55 μm) |
| (BENDING) | 0.1dB/km BELOW | R30, ±90°×10C (@1.55 μm) |
| (IMPACT) | 0.1dB/km BELOW | 0.3kg·m×1C (@1.55 μm) |
| (NUMBER OF TWISTS) | 0.1dB/km BELOW | L=1m, ±90°×1C (@1.55 μm) |
| (TENSION) | 0.1dB/km BELOW | 70kg (@1.55 μm) |

OPTICAL FIBER DROP CABLE

BACKGROUND OF THE INVENTION

1. Field of the Invention

The present invention relates to an optical fiber drop cable suitable for a FTTH (Fiber to the Home) application, that is, an application where, in order to enable high speed wide band information such as ultra high speed data to be transmitted to and received from even a home or an office, an optical fiber cable extending from a telephone company allows an optical fiber cable core wire to be drawn and wired to a subscriber user such as a usual home and, more particularly, to an improvement over a tensile strength member forming an optical fiber drop cable (external wiring) to be used when drawing an optical fiber to a local home from an electric pole.

2. Description of the Related Art

Referring to FIG. 1A, an optical fiber drop cable 101 has a structure which is comprised of an optical fiber core wire 103 (or optical fiber tape-shaped core wire) with a diameter of, for instance, 0.25 mm and a pair of tensile strength members 105, 105, composed of conductive metallic wires each including a steel wire with a diameter of, for instance, 0.4 mm, which are disposed along the optical fiber core wire 103. The optical fiber core wire 103 and the adjacent tensile strength members 105, 105 are collectively covered with a cable sheath 107 made of thermoplastic resin, such as PVC or fire-retardant PE, to form an optical element section 109, which is integrally connected to a cable support wire section 115, serving as a tensile strength member, in parallel thereto via a constricted neck portion 117, with the cable support wire section 115 including a support wire 111 composed of a metallic wire, such as a steel wire with a diameter of, for instance, 1.2 mm, and covered with a thermoplastic resin sheath 113 such as PVC (polyvinyl chloride) and fire-retardant PE (polyethylene).

Also, as shown in FIG. 1A, the cable sheath 107 has both left and right sides formed with notch portions 119, 119 for cable splicing to take out the optical fiber core wire 103.

Further, heretofore known optical fiber drop cable of this type is disclosed in Japanese Patent Application laid open Publication No. 2001-83385. As shown in FIG. 1B, the fiber drop cable is comprised of an optical element 202 including an optical fiber core wire or an optical fiber tape-shaped core wire 201 and a pair of adjacent tensile strength members T, T composed of conductive metal wires, such as steel wires, respectively, with the optical fiber core wire 201 and the adjacent tensile strength members T, T being covered with a cable sheath S made of thermoplastic resin, and a cable support wire section 203 having a support wire R composed of metal, such as a steel wire, and integrally connected to the optical element section 202 in parallel thereto via a constricted neck portion 204. Further, the fiber drop cable is structured such that during installation, the support wire section 203 and the optical element section 202 are broken away from one another at the neck portion 205.

SUMMARY OF THE INVENTION

However, it is feared that not only the optical fiber drop cable 101 previously described but also the other related art optical fiber drop cable encounter accidents, such as burning out of indoor equipments, induced by lightening due to the presence of the conductive metallic wires forming the support wire 111 of the cable support wire section 115 and the tensile strength members 105, 105 of the optical element section 109. For this reason, attempts have heretofore been made for either an approach to cut the optical fiber drop cable 101 at the junction closure mounted to an indoor wall surface of the building or the local home to avoid the optical element section 109 from being drawn inside or an approach to cut only the tensile strength members 105, 105 (steal wires) inside the optical element section 109, using a specific tool, to allow the optical fiber core wire 103 to be drawn inside the home.

Incidentally, since the cable support wire section 115 is cut at and fixed to the electric pole or the eaves of the local home when drawing the cable support wire section 115 thereto, there is less problem.

In order to improve the deficiencies set forth above, by replacing the conductive metallic material forming the tensile strength members 105, 105 of the optical element section 109 in question with non-conductive material such as fiberglass, aramid fiber and FRP or the like to form a non-metallic configuration, the above issues may be improved.

Furthermore, with the usual optical fiber drop cable 101, if there is a low magnitude of adhesive force between the tensile strength members 105, 105 and the cable sheath 107, as explained in Japanese Patent Application laid open Publication No. 2000-171673, then the cable 101 undergoes bending and rigorous displacements or the like and, in addition, encounters thermal history such as heat cycles etc., resulting in an increase in optical transmission loss or troubles such as disconnections of the optical fiber core wire 103 encapsulated in the cable.

Accordingly, the adhesive force (extracting force) between the tensile strength members 105, 105 of the optical element section 109 and the cable sheath 107 forms an important factor in terms of the characteristics of the optical fiber drop cable. But, when manufacturing the above optical fiber drop cable 101 through extrusion forming, a mere technology of extrusion forming the con-conductive material, such as the fiberglass, aramid fiber, FRP (Fiber Reinforced Plastic) or the like, to be used as the tensile strength members 105, 105 inside the optical element section 109 together with the other members such as the support wire 111 and the optical fiver core wire 103 is hard to obtain an appropriate adhesive force. To increase the above adhesive force, with the invention disclosed in Japanese Patent Application laid open Publication No. 2000-171673, a layer of bonding agent is interposed between the tensile strength members 105, 105 and the cable sheath 107. However, the presence of the intervened bonding agent layer results in an increase in manufacturing costs.

The present invention has been made to address such issues mentioned above and has a first object to increase an adhesive force between tensile strength members inside an optical element section and a cable sheath without need for a layer of bonding agent. Further, the present invention provides an optical fiber drop cable, which enables an anti-twist turning property to be improved to avoid an increase in optical transmission loss.

It is a second object of the present invention to provide an optical fiber drop cable that has tensile strength members for an optical element section to be wired to an indoor area of a local home to be structured with non-conductive material of a low cost for avoiding a risk of being struck by lightening while enabling reduction in cost of the cable.

In order to achieve the above objects, an optical fiber drop cable according to a first aspect of the present invention comprises an elongated optical element section having an optical fiber core wire and at least one pair of first tensile strength members, disposed on both sides of the optical fiber core wire in parallel thereto to hold the optical fiber core wire between the first tensile strength members, which are covered with a cable sheath; and an elongated cable support wire section continuously or intermittently adhered to the elongated optical element section in parallel thereto and having a second tensile strength member covered with a sheath; wherein the first tensile strength members includes a collected body of tensile strength fibers made of non-conductive material.

According to the above first aspect, since the first tensile strength members of the optical element section are made of non-conductive material, it is possible to prevent an accident of being struck by lightening. Further more, according to the first aspect, the presence of intermittent connection between the optical element section and the cable support wire section provides an ease of separation between these components to provide an improved efficiency in installation.

An optical fiber drop cable according to a second aspect of the present invention concerns the optical fiber drop cable with the features of the above first aspect, wherein the non-conductive tensile strength fibers forming the first tensile strength members have a unit fiber with a Young's modulus of a value not less than 5000 kg/mm$^2$ and a collected amount of the fibers is in a range between 1000 denier and 2000 denier.

An optical fiber drop cable according to a third aspect of the present invention concerns the optical fiber drop cable with the features of the above first aspect, wherein a filling rate of fibers forming a collected body of the non-conductive tensile strength fibers forming the first tensile strength members is in a range above 50% of a cross sectional area of the collected body.

According to the above second and third aspects, there is less probable for the optical fiber to be disconnected when splicing the optical element section and the cable support wire section from one another with no increase in optical transmission loss of the optical fiber per se.

In order to achieve the above objects, an optical fiber drop cable according to a fourth aspect of the present invention comprises an elongated optical element section having an optical fiber core wire and at least one pair of first tensile strength members, disposed on both sides of the optical fiber core wire in parallel thereto to hold the optical fiber core wire between the first tensile strength members, which are covered with a cable sheath, and an elongated cable support wire section adhered to the elongated optical element section in parallel thereto and having a second tensile strength member covered with a sheath, wherein the first tensile strength members have outer peripheries formed in rugged configurations, respectively, to increase adhesive forces between the first tensile strength members and the cable sheath.

According to the optical fiber drop cable according to the fourth aspect of the invention set forth above, since the outer peripheries of the first strength members are formed in rugged configurations, increased adhesive force are created between the first tensile strength members and the cable sheath due to anchoring effects of the rugged configurations while providing an improved anti-twist turning characteristic and avoiding an increase in an optical transmission loss. Further, there is no need for coating a bonding agent as required in the related art practice during an extrusion forming process.

Further, an optical fiber drop cable according to a fifth aspect of the present invention concerns the optical fiber drop cable with the features of the above first aspect, wherein the first tensile strength members are made of non-conductive material.

According to the above fifth aspect, since the first tensile strength members of the optical element section are made of non-conductive material, it is possible to prevent an accident of being struck by lightening.

An optical fiber drop cable according to a sixth aspect of the present invention concerns the optical fiber drop cable comprises an elongated optical element section having an optical fiber core wire and at least one pair of first tensile strength members, disposed on both sides of the optical fiber core wire in parallel thereto to hold the optical fiber core wire between the first tensile strength members, which are covered with a cable sheath; and an elongated cable support wire section continuously or intermittently adhered to the elongated optical element section in parallel thereto and having a second tensile strength member covered with a sheath; wherein at least one of the first tensile strength members includes a collected body of tensile strength fibers made of non-conductive material.

According to the sixth aspect, since the first tensile strength members of the optical element section to be drawn into the local home are made of non-conductive material, it is possible to prevent a danger of being struck by lightening.

An optical fiber drop cable according to a seventh aspect of the present invention concerns the optical fiber drop cable with the features of the above first aspect, wherein the cable sheath covered on the optical fiber core wire and the first tensile strength members, and the sheath covered on the second tensile strength member are made of the same thermoplastic material and unitarily adhered to one another.

According to the above seventh aspect, since the above cable sheath and the sheath are integrally adhered to one another by means of the common thermoplastic resin, the cable sheath and the sheath can be collectively extruded to cover the optical fiber core wire, the first and second tensile strength members while permitting these components to travel together, with a resultant reduction in the number of manufacturing steps to enable fabrication in a single step.

BRIEF DESCRIPTION OF THE DRAWINGS

FIG. 3A is a cross sectional view of a first tensile strength member forming one embodiment of the invention, with the first tensile strength member shown in a confetti type.

FIG. 3B is a cross sectional view of the first tensile strength member forming one embodiment of the invention, with the first tensile strength member shown in a cross shape type.

FIG. 3C is a cross sectional view of the first tensile strength member forming one embodiment of the invention, with the first tensile strength member shown in a star shape type.

FIG. 4 is a schematic manufacturing view for the optical fiber drop cable of one embodiment of the invention.

FIG. 5 is a view illustrating a result of a comparison test for extruding forces between the related art and the invention.

FIG. 6 is a view illustrating characteristics of the optical fiber drop cable of the invention.

DESCRIPTION OF PREFERRED EMBODIMENT

An embodiment of the present invention is described below in detail with reference to the accompanying drawings.

Figure 1A:
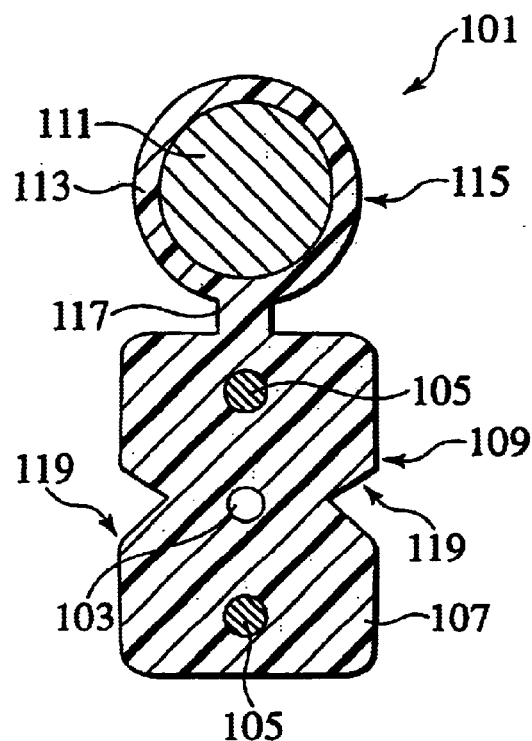
FIG. 1A is a schematic cross sectional view of a related art optical fiber drop cable.
Figure 1B:
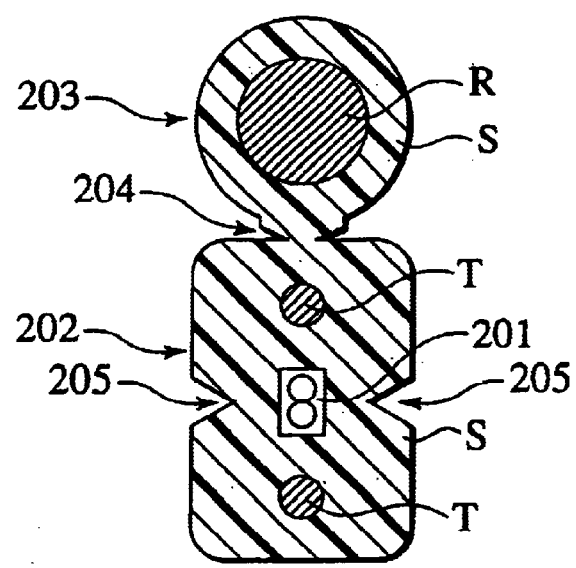
FIG. 1B is a transverse cross sectional view of another related art optical fiber drop cable which is different in structure from FIG. 1A.
Figure 2A:
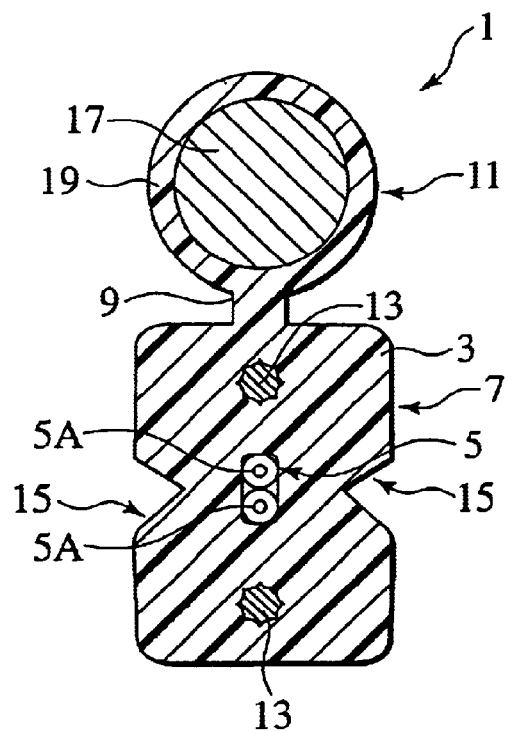
FIG. 2A is a cross sectional view of an optical fiber drop cable of one embodiment according to the present invention.

Referring to FIG. 2A, an optical fiber drop cable 1 includes an elongated optical element section 7 comprised of a sheath 3 that encapsulates an optical fiber single wire or an optical fiber core wire (which are hereinafter referred to as an optical fiber core wire 5) with an optical fiber 5A being covered with a plastic material, and an elongated cable support wire section 11 integrally fixed to the optical element section 7 in parallel thereto in a continuously or intermittently connected relationship via a constricted neck portion 9.

At least one pair of first elongated tensile strength elements, such as first tensile strength members 13, 13 are disposed in parallel to one another in the optical element section 7 on both sides of the optical fiber core wire 5, with each of these tensile strength elements being covered with a cable sheath made of thermoplastic material such as polyethylene (PE) and polyvinyl chloride (PVC) or the like to form the elongated optical fiber section 7.

Each of the first tensile strength elements 13, 13 that form essential parts of the presently filed embodiment has an outer periphery formed in a rugged configuration. With a structure shown in FIG. 2A, a cross sectional shape perpendicular to a longitudinal length of each of the first tensile strength elements 13, 13 has a confetti type configuration with eight lobes, providing an increased mechanical adhesive strength (bonding strength) between the first tensile strength members 13, 13 and the cable sheath 3 owing to an anchoring effect caused by the rugged configuration set forth above.

Referring to FIGS. 3A to 3C, FIG. 3A shows the confetti type configuration shown in FIG. 2A in an enlarged scale, and the tensile strength members may take suitable cross sectional shapes, such as a cross shape shown in FIG. 3B, a star shape shown in FIG. 3C or any other configurations with multiple projections being circumferentially spaced on the outer circumferential periphery of the tensile strength element 13.

Also, each of the first tensile strength members 13, 13 is made of non-conductive material, such as fiberglass, aramid fiber and FRP or the like to avoid accidents caused by attack from lightning.

In addition, the elongated optical element section 7 is formed with notch portions 15, 15 formed on left and right opposing side surfaces, shown in FIG. 2A, of the cable sheath 3 to allow for splicing of the cable to take out the optical fiber core wire 5.

Figure 2B:
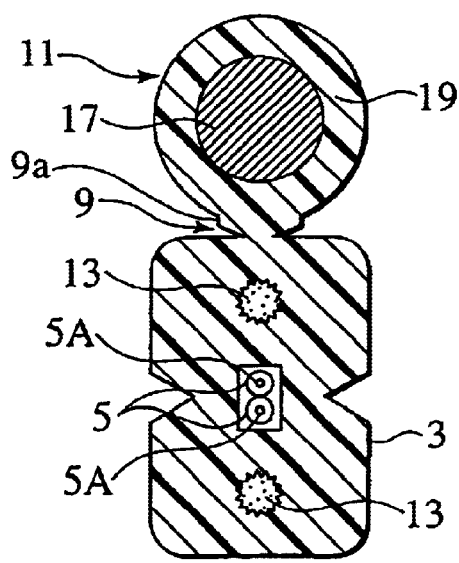
FIG. 2B is a cross sectional view illustrating another embodiment according to the present invention.
Figure 7:
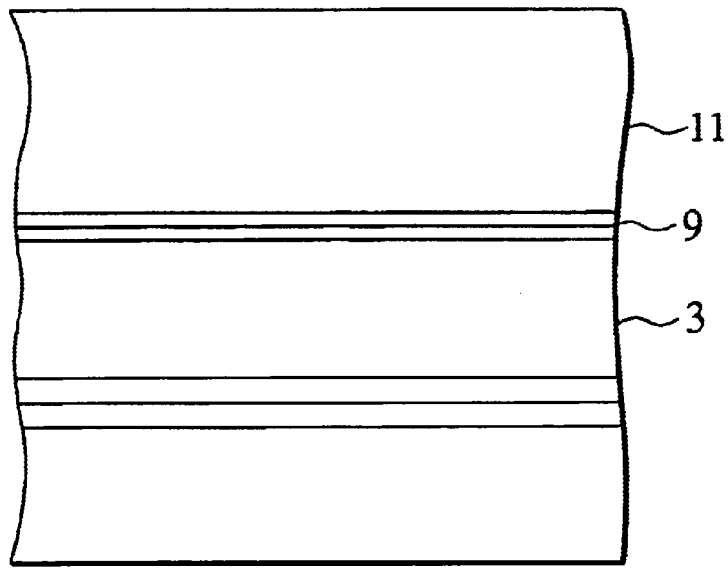
FIG. 7 is a side view of the optical fiber drop cable of FIG. 1B.

Further, the cable support wire section 11 is comprised of a support wire 17 covered with a sheath 19 which is made of thermoplastic material to serve as a second tensile strength element. The support wire (second tensile strength member) 17 is made of metallic wire such as a steel wire. The elongated support wire section 11 with such a structure stated above is integrally connected to the elongated optical element section 7 via the constricted neck portion 9 extending parallel thereto. Also, an alternative structure shown in FIG. 2B has substantially the same structure as the structure of the embodiment shown in FIG. 2A except for that, with the embodiment of FIG. 2B, the neck portion 9 is provided with a stepped portion 9a. With such a structure, it becomes possible for a tearing property of the neck portion 9 to be adjusted.

Now, a method of manufacturing the optical fiber drop cable 1 of one embodiment according to the present invention set forth above is described below.

An extruding machine 21 that forms the optical fiber drop cable 1 is shown in FIG. 4. In operation, the optical fiber core wire 5 and a pair of adjacent first tensile strength members 13, 13 are fed to respective given positions of an extrusion die, such as an extrusion head 23, of the extruding machine 21, and the support wire (second tensile strength element) 17 is supplied to a given position of the extrusion head 23. Also, the optical fiber core wire 5, the first tensile strength members 13, 13 and the support wire (second tensile strength member) 17 are supplied from respective bobbins 18.

Further, thermoplastic resin, that forms the cable sheaths 3, 19 of the optical element section 7 and the cable support wire section 11, is collectively extruded and covered within the extrusion head 23 to form the two cable sheaths 3, 19 in a unitarily fixed condition. That is, when the optical fiber core wire 5 and the first tensile strength members 13, 13 are covered with the cable sheath (protective covering) 3, the support wire (second tensile strength element) 17 is also simultaneously covered with the sheath 19. In this case, the cable sheath 3 and the sheath 19 are common to one another.

Furthermore, in order to compare adhesive forces between the first tensile strength member 13 and the cable sheath 3 in the optical fiber drop cable 1 of the embodiment set forth above and the related art optical fiber drop cable, the related art optical fiber drop cable was manufactured as a Comparison Sample 1, and the optical fiber drop cable 1 of the presently filed embodiment was manufactured as a Sample 2.

Also, in Samples 1 and 2, PET strings were used as the first tensile strength members (with the tensile strength member 13 in Sample 2). As shown in FIG. 5, cross sectional shapes and sizes of the PET strings were selected such that in Sample 1, the string had a circular shape with a diameter of 0.6 mm φ and in Sample 2, the string had the confetti shape with eight lobes with a circumscribing circle diameter of approximately 0.6 mm φ and an inscribed circle diameter of approximately 0.4 mm φ. Moreover, extracting forces of the respective tensile strength elements of Samples 1 and 2 are indicated in FIG. 5.

With the structures described above, the first tensile strength member of Sample 1 had the extracting force of approximately 1~5 N/cm, whereas the first tensile strength member of Sample 2 had extracting force of approximately 10 N/cm. Namely, the extracting force of the cable 1 of the presently filed embodiment exhibited more than two times that of the related art cable. That is, it appears that the adhesive force between the tensile strength member 13 and the cable sheath 3 is highly improved owing to the anchoring effect of the rugged configuration formed on the outer periphery of the first tensile strength member 13.

Consequently, this results in no need for coating adhesive or the like, as required in the related art practice, in order to improve the adhesive force between the first tensile strength member 13 and the cable sheath 3, with a resultant improvement over a productivity of the cable.

Further, a general property of the optical fiber drop cable 1 of the above Sample 2 is exhibited as shown in FIG. 6. As will be appreciated from FIGS. 5 and 6, the property of Sample 2 is identical to that of the usual optical fiber drop cable.

Furthermore, it is conceivable that causes of an increase in an optical transmission loss of the optical fiber drop cable during installation thereof are derived from a result wherein the cable, uniformly twisted in a given length, are formed with twisted turns concentrated at an extremely limited area. However, the presence of the first tensile strength member 13 with its outer periphery formed with the rugged configuration as proposed in the presently filed embodiment enables an improvement in anti-twisting property, providing a capability for avoiding an increase in the optical transmission loss.

Also, it is to be understood that the present invention is not limited to the embodiments discussed above and may be carried out in other alternative embodiments with suitable modifications.

Subsequently, referring to FIGS. 2A, 2B and FIGS. 7, 8, a detailed description is given below for the tensile strength element of the optical fiber drop cable 1 according to the present invention.

With the optical fiber drop cable 1 according to the present invention, each of the above pair of tensile strength members 13, 13 is comprised of a collected body of a non-conductive tensile strength fiber with a high tensile strength, such as aramid fiber, for instance, known as "Kevlar" (a trademark), a high polymer fiber such as a PBO fiber formed by spinning polyparaphenylenbenzo-bis-oxazole (PBO), and a fiber made of composite material with a matrix between fiberglass, other aramid fiber, PBO fiber or fiberglass and synthetic resin.

And, Yong's modulus of these fibers may be preferably not less than $5000/mm^2$. Also, an amount of fibers to be collected is selected to be more than or equal to 1000 denier and less or equal to 2000 denier. Here, if the amount of fibers is less than 1000 denier, the fibers have a degraded rigidity, and if the amount fibers is more than 2000 denier, the fibers form a cable with an increased diameter, providing an undesired result with no capability in satisfying specified wind pressure load. Incidentally, the cable may preferably have an outer diameter of approximately 6 mm (millimeter) in the maximum value in consideration of an allowable wind pressure load.

Further, with a meaning of a filling rate of collected fibers forming the first tensile strength member 13, that is, a ratio of total sum of cross sectional areas filled with tensile strength fibers to a cross sectional area of an opening gap occupied with the fiber group, if the filling rate is above 50%, then an advantage is obtained in that there is less probability in occurrence of a breakage of the optical fiber core wire and an increase in transmission loss of the optical fiber core wire during a subsequent splicing into the support wire section 11 and the optical element section 7.

The elongated optical element section 7 with such a structure set forth above is unitarily connected to the elongated cable support wire section 11, extending parallel to the optical element section 7, via the constricted neck portion 9 to form the optical fiber drop cable.

The cable support wire section 11 is structured with other support wire (second tensile strength member) 17 that includes, for instance, a steel wire covered with the sheath 19 made of thermoplastic resin. Also, since the support wire (second tensile strength member) 17 is required to be tied to an outdoor wire fixture in a manner as will be described below, in case of using the steel wire, the steel wire is preferably selected to have an outer diameter less than 1.4 mm and more preferably less than 1.2 mm.

Further, alternatively, the optical element section 7 and the cable support wire section 11 are separately formed into discrete elements, which in turn may be fixed to one another in intermittent lengths by means of a third binding means, such as, for instance, a plastic binding wire and a plastic binding metallic fixture.

Figure 8:
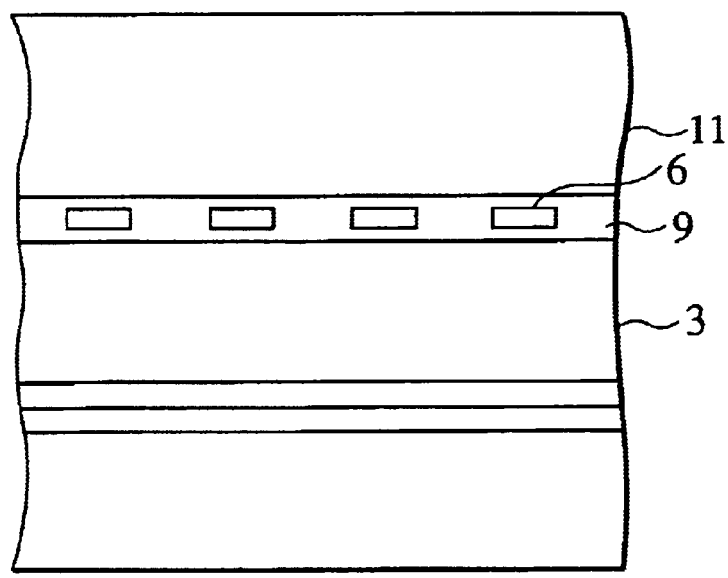
FIG. 8 is a side view illustrating another example of the invention.

Furthermore, as shown in FIG. 8, slits or windows 6 are intermittently formed in the neck portion 9 interconnecting the optical element section 7 and the cable support wire section 11 with respect to one another, providing an ease of separating these components.

Figure 9:
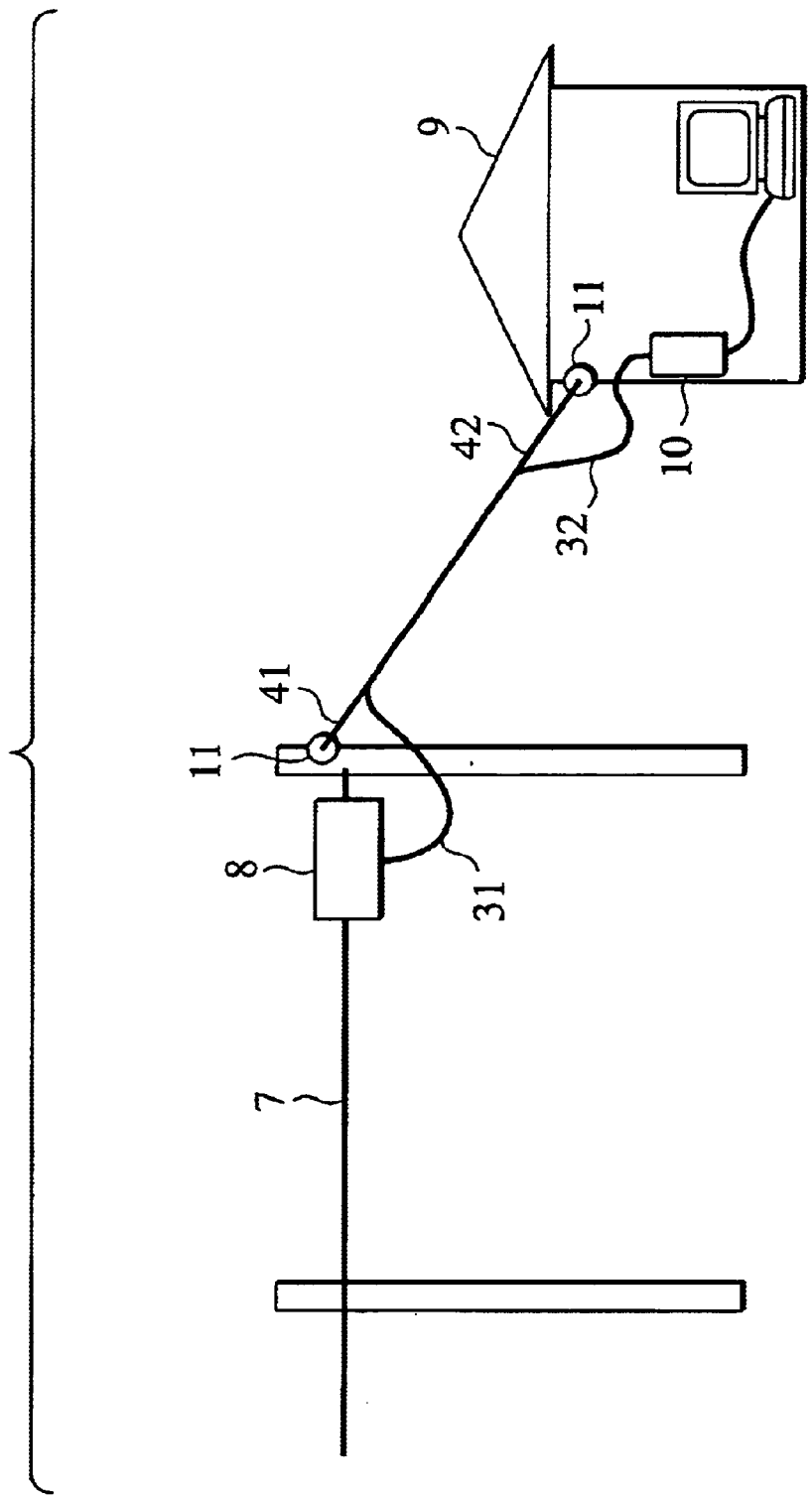
FIG. 9 is a view illustrating a status in which the cable of the invention is installed.

Now, a method of laying an optical fiber drop cable according to the invention is described in detail with reference to FIG. 9.

The optical fiber drop cable embodying the invention is wired between a cable branch junction closure 8, which mounts an end of an overhead optical fiber cable 7 extending from a telephone company and supported on a utility pole, and a subscriber home 9 and drawn down to the home from the overhead optical fiber cable.

And, when drawing down the optical fiber core wire to each home from the optical fiber cable extending from the telephone company through the use of the drop cable, the neck portions 9 at both ends of the drop cable are partly spliced to cause the optical element section 7 and the cable support wire section 11 to be separate from one another, with separated one end 41 of the to cable support wire section 11 being fixed to an external wiring fixture 11 of the electric pole while the other end 42 being fixed to a part of the home by means of a fixture 11.

Further, one end 31 of the optical element section 7 is connected to the cable branch junction closure (cable closure) 8, and the other end 32 is connected to an inside OE converter or a terminal box 10.

Also, one terminal end of the first tensile strength member 13 of the optical element section 7 is connected to the cable branch junction closure (cable closure) 8, and the other terminal end is connected to the inside OE converter or the terminal box 10.

Further, in a case where the tensile strength element of the cable support wire 11 is made of steel wire, the cable support wire section 11 may be preferably connected to the ground at the time of completing the wiring in view of taking a measure for lightening. While the pair of first tensile strength members 13, 13 have been described in terms of an example where the tensile strength fibers each made of non-conductive material are used, it may be possible for one of the pair of first tensile strength members 13, 13 to be composed of the tensile strength fiber of non-conductive material with the other one of the pair of first tensile strength members 13, 13 being made of FRP of non-conductive material.

What is claimed is:

1. An optical fiber drop cable comprising:
an elongated optical element section having an optical fiber core wire and at least one pair of first tensile strength members, disposed on both sides of the optical fiber core wire in parallel thereto to hold the optical fiber core wire between the first tensile strength members, which are covered with a cable sheath; and an elongated cable support wire section continuously or intermittently adhered to the elongated optical element section in parallel thereto and having a second tensile strength member covered with a sheath;

wherein the first tensile strength members includes a collected body of tensile strength fibers made of non-conductive material, and wherein the first tensile strength members have outer peripheries formed in rugged configurations, respectively, to increase adhesive forces between the first tensile strength members and the cable sheath.

2. The optical fiber drop cable of claim 1, wherein the non-conductive tensile strength fibers forming the first tensile strength members have a unit fiber with a Young's modulus of a value not less than 5000 kg/mm$^2$ and a collected amount of the fibers is in a range between 1000 denier and 2000 denier.

3. The optical fiber drop cable of claim 1, wherein a filling rate of fibers forming the collected body of the non-conductive tensile strength fibers forming a first tensile strength members is in a range above 50% of a cross sectional area of the collected body.

4. An optical fiber drop cable comprising:

an elongated optical element section having an optical fiber core wire and at least one pair of first tensile strength members, disposed on both sides of the optical fiber core wire in parallel thereto to hold the optical fiber core wire between the first tensile strength members, which are covered with a cable sheath; and an elongated cable support wire section continuously or intermittently adhered to the elongated optical element section in parallel thereto and having a second tensile strength member covered with a sheath;

wherein at least one of the first tensile strength members includes a collected body of tensile strength fibers made of non-conductive material, and wherein the first tensile strength members have outer peripheries formed in rugged configurations, resoectively, to increase adhesive forces between the first tensile strength members and the cable sheath.

5. The optical fiber drop cable of claim 4, wherein the cable sheath covered on the optical fiber core wire and the first tensile strength members, and the sheath covered on the second tensile strength member are made of the same thermoplastic material and unitarily adhered to one another.

6. The optical fiber drop cable of claim 4, wherein the non-conductive tensile strength fibers forming the first tensile strength members have a unit fiber with a Young's modulus of a value not less than 5000 kg/mm$^2$ and a collected amount of the fibers is in a range between 1000 denier and 2000 denier.

7. The optical fiber drop cable of claim 4, wherein a filling rate of fibers forming the collected body of the non-conductive tensile strength fibers forming a first tensile strength members is in a range above 50% of a cross sectional area of the collected body.

\* \* \* \* \*